United States Patent [19]

Haendle et al.

[11] 4,437,117
[45] Mar. 13, 1984

[54] X-RAY TELEVISION INSTALLATION FOR MONITOR PHOTOGRAPHY

[75] Inventors: Joerg Haendle; Heinz Horbaschek, both of Erlangen, Fed. Rep. of Germany

[73] Assignee: Siemens Aktiengesellschaft, Berlin & Munich, Fed. Rep. of Germany

[21] Appl. No.: 309,188

[22] Filed: Oct. 7, 1981

[30] Foreign Application Priority Data

Oct. 21, 1980 [DE] Fed. Rep. of Germany ....... 3039708

[51] Int. Cl.³ .............................................. H04N 5/32
[52] U.S. Cl. .................................... 358/111; 358/183; 358/242; 358/244; 378/99
[58] Field of Search ............... 358/111, 183, 242, 244; 378/99, 100

[56] References Cited

U.S. PATENT DOCUMENTS

| | | | |
|---|---|---|---|
| 2,709,769 | 5/1955 | Neumann | 358/242 |
| 2,816,157 | 12/1957 | Andreas et al. | 358/244 |
| 3,257,506 | 6/1966 | Siepmann | 358/183 |
| 4,193,089 | 3/1980 | Brougham et al. | 358/111 |

FOREIGN PATENT DOCUMENTS 2385116 10/1978 France.

OTHER PUBLICATIONS

A Large Screen X-ray Image Amplifier–Electronics Engineering–Jun. 1959, pp. 352-353.

*Primary Examiner*—Joseph A. Orsino, Jr.
*Attorney, Agent, or Firm*—Hill, Van Santen, Steadman & Simpson

[57] ABSTRACT

An exemplary embodiment comprises an x-ray tube, an x-ray image intensifier, a television camera, a photographic camera, and a monitor system, which includes a video amplifier, a synchronizing pulse separation stage, a horizontal and a vertical deflection stage, a blanking stage and a picture tube with a deflection unit. The monitor system is provided with a pulse stage for the purpose of generating trace unblanking pulses for the formation of bright horizontal and/or vertical bars bounding the displayed image at the border of the picture tube, which pulse stage is connected with the synchronizing pulse separation stage. The photographic camera is so designed that the displayed images are adjacently photographed so as to avoid light transmitting interstices between the photographed images on the x-ray negative.

2 Claims, 9 Drawing Figures

X-RAY TELEVISION INSTALLATION FOR MONITOR PHOTOGRAPHY

BACKGROUND OF THE INVENTION

The invention relates to an x-ray television installation for monitor photography comprising an x-ray tube, an x-ray image intensifier, a television camera, a photographic camera, and a monitor which exhibits a video amplifier, a sync pulse separation stage, a horizontal and a vertical deflection stage, a blanking stage, and a picture tube with a deflection unit. X-ray television installations of this type serve the purpose of permanent storage of x-ray video images for a documentation and/or for examination purposes and diagnostic opinions.

For this purpose, camera units are increasingly employed which permit the subdivision of a large-format film (e.g. 18×24 cm) into many different image formats, such as, for example, full-format 18×24 cm to 5×5 cm (slide transparency format). It is thereby possible to take, on one transparent film, a varying number of photographs which is determined by the desired number of images of the photographic series and/or by the desired detail recognition.

From the French LP No. 2,385,116 an x-ray diagnostic installation is known with which, through a camera, several images of a monitor can be adjacently photographed on a sheet film. Via an optical lens system and a mirror arrangement, the image from a monitor is photographed on a portion of a sheet film. Through the displacement of the mirror arrangement, several images can thus be adjacently exposed.

Since the photographs do not contact one another, unexposed interstices result which form bright bars in the negative. These bright interstices interfere during the viewing of the photographs in front of a viewing box, since, through indirect glare, the adaptation of the eyes to the luminance of the photographs does not proceed correctly. This thus reduces the visual acuity.

SUMMARY OF THE INVENTION

The invention proceeds from the object of providing an x-ray television installation of the type initially cited with which photographs can be provided which render possible an undisturbed viewing with a high visual acuity.

In accordance with the invention, the object is achieved in that a pulse stage for generating trace unblanking pulses for the formation of bright horizontal and/or vertical bars bounding the image at the edge of the monitor is connected with the sync pulse separation stage, and that the photographic camera is so designed that the monitor images are adjacently photographed without an unexposed interstice boundary therebetween. The photographs in the negative are thereby bounded by dark bars, so that a misadaptation of the eyes cannot occur and all details of the photographs can be recognized without glare.

A simultaneous photograph of the x-ray image and of the bars can take place if a mixing stage is connected with the pulse stage and the video amplifier whose output signal is supplied to the picture tube, and if the deflection stages are so designed that their sawtooth voltages are variable in such a manner that retrace times result which are so brief that the image format, reduced by the frame, exhibits the full image contents. The photography of the image and of the bright bars proceeds successively if a changeover switch is present through which the outputs of the pulse stage or of the video amplifier are connectible to the picture tube, and if a program control installation is connected with the horizontal and vertical deflection stage and the changeover switch, which program control installation, during a photograph, for the purpose of image exposure, connects via the changeover switch the video amplifier with the picture tube and reduces the amplitudes of the sawtooth voltages of the deflection stages and, for the purpose of frame exposure, actuates the changeover switch in such a manner that the pulse stage is connected with the picture tube. A simple construction can be obtained if the pulse stage is so designed that it fades in only a horizontal and a vertical bright bar into the monitor image. The tolerances in the case of the photograph can be greater if the pulse stage is so designed that the bright bars surround the entire monitor image.

The invention shall be explained in greater detail in the following on the basis of exemplary embodiments illustrated on the accompanying drawing sheets; and other objects, features and advantages will be apparent from this detailed disclosure and from the appended claims.

DETAILED DESCRIPTION

Figure 1:
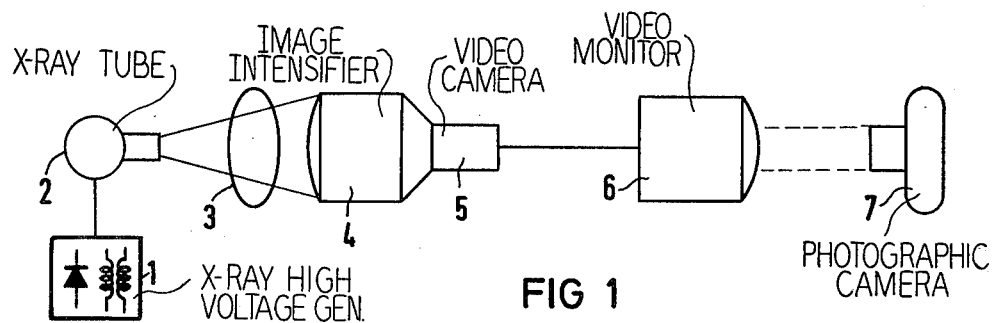
FIG. 1 illustrates a block circuit diagram of an x-ray diagnostic installation for the purpose of explaining the invention.

In FIG. 1, an x-ray diagnostic installation is illustrated to which the invention can be applied. An x-ray generator 1 operates an x-ray tube 2 which emits a radiation beam which penetrates a patient 3 and forms a radiation image on an x-ray image intensifier 4. The radiation image, converted and intensified in the x-ray image intensifier 4, is picked up by a television camera 5 and displayed on a monitor 6. A photographic camera 7 is aligned to the viewing screen of the monitor 6, which photographic camera 7 can photograph the monitor image. Instead of a simple camera for roll films illustrated here, a multiformat camera for sheet films such as initially described herein can also be employed.

Figure 2:
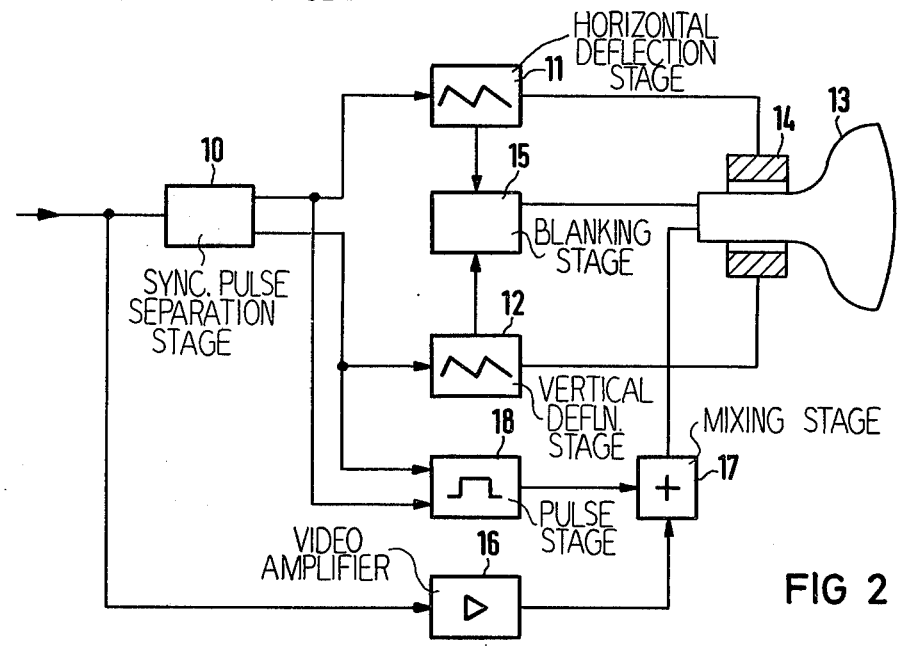
FIG. 2 illustrates a block circuit diagram of an embodiment of the monitor of FIG. 1.

In FIG. 2 the significant portion of the circuit construction of the monitor 6 of FIG. 1 is illustrated. The video signal of the television camera 5 is supplied to a sync pulse separation stage 10 which generates therefrom horizontal and vertical sync pulses which are supplied to the horizontal deflection stage 11 and to the vertical deflection stage 12. The horizontal deflection stage 11 and the vertical deflection stage 12 are connected with a deflection unit diagrammatically indicated at 14 mounted on a picture tube 13. Both deflection stages 11 and 12 are connected to a blanking stage 15 for blanking the beam retrace, the stage 15 being connected with the nonillustrated control electrode of the picture tube 13.

The input signal of the monitor 6 is supplied to a video amplifier 16 which is connected with a mixing stage 17. There is furthermore connected to the mixing stage 17 a pulse stage 18 which is subjected to the horizontal and vertical pulses of the sync pulse separation stage. The output signals of the video amplifier 16 and of the pulse stage 18, superimposed in the mixing stage 17, are supplied to the cathode of the picture tube 13.

Figure 3:
FIGS. 3 through 5 illustrate voltage waveforms for the purpose of explaining FIG. 2.
Figure 4:
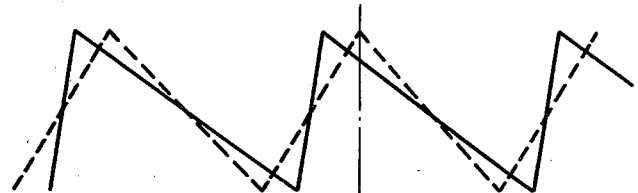
Figure 5:
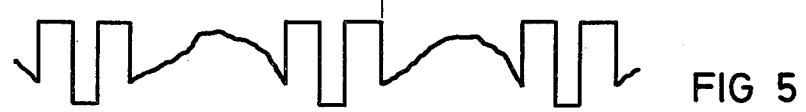

On the basis of FIGS. 3 through 5, the method of operation of the monitor 6 shall now be explained in greater detail. The video signal illustrated in FIG. 3 is supplied to the sync pulse separation stage 10 which separates therefrom the horizontal and vertical sync pulses which are prepared and amplified in the deflection stages 11 and 12. As compared with the normal horizontal deflection illustrated with a dash line in FIG. 4, in which the retrace times are characterized by the increase in the sawtooth voltage, the described embodiment exhibits shortened retrace times which are illustrated by the waveform shown with a solid line in FIG. 4.

In the case of a conventional 50 Hz European television standard with 1249 lines, a vertical deflection time of 20 ms results. Of this time, for example, 17.5 ms are utilized for the presented image contents, 1.22 ms for the overriding on the monitor edge, and 1.28 ms for the blanking of the beam retrace. In the case of a retrace time abbreviation to 0.2 ms, one obtains 2.3 ms for the edge representation, so that, in the case of a 17 cm large viewing screen, above and below, respectively, a trace-unblanked edge of approximately 6 mm results. In the case of a horizontal deflection time of thirty-two microseconds (32 μs), conventionally twenty-four microseconds (24 μs) for the image contents, two microseconds (2 μs) for the overwriting and six microseconds (6 μs) for the retrace blanking, are employed. In the case of the retrace time abbreviation to three microseconds (3 μs) one can employ five microseconds (5 μs) for the representation of the trace-unblanked lateral edges which exhibit a width of approximately 9 mm.

From the perpendicular dot-dash auxiliary line connecting FIGS. 3-5 (representing the beginning of an actual image portion in FIG. 3), it becomes apparent that lower deflection amplitudes (as shown in FIG. 4) are available for the image contents of the video signal, as a consequence of which the monitor image is somewhat reduced.

Pulse-shaped signals are combined with the video signal from the video amplifier 16 in the mixing stage 17, which pulse-shaped signals produce on the picture tube 13 a bright border surrounding the image contents. This is effected by the rectangular pulses illustrated in FIG. 5 before and after the picture signal. The curve progression of FIG. 5 represents the output signal of the mixing stage 17 which is supplied to the picture tube 13.

This monitor image is now photographed by the multi-format camera. On the large-format sheet film the photographs are brought close together to such an extent that the dark picture frames slightly overlap in order that tolerances are compensated. The picture contents thereby exhibit the same size as in the case of the previous photographs. The dark picture frames now take the place of the previous bright separation stripes between the photographs.

Figure 6:
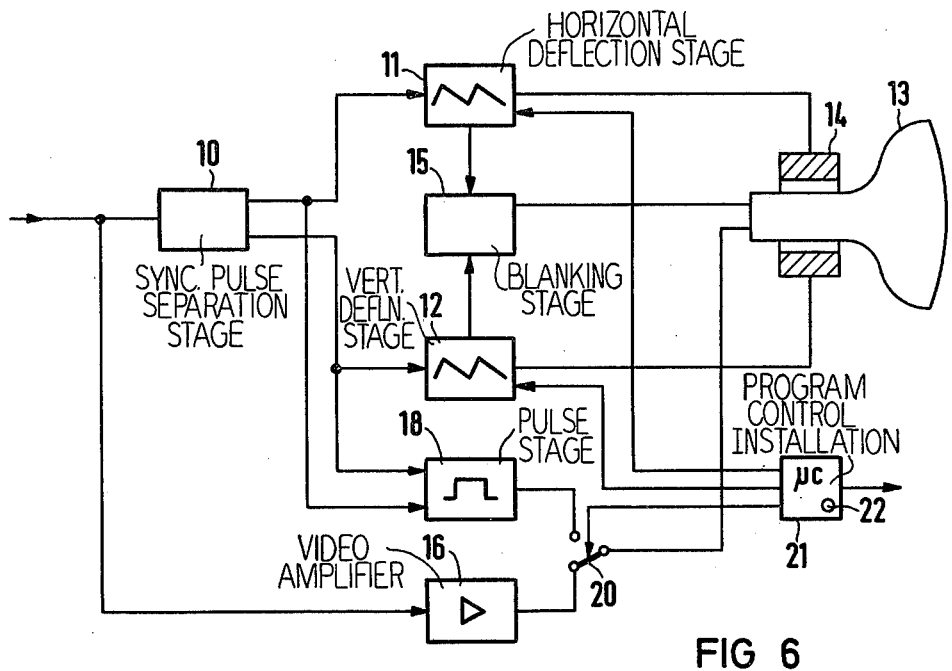
FIG. 6 illustrates a block circuit diagram of an additional embodiment of the monitor of FIG. 1.

In FIG. 6, the construction of FIG. 2 has been essentially retained. The mixing stage 17, however, is replaced by a changeover switch 20 which connects the video amplifier 16 and the pulse stage 18 successively with the picture tube 13. The switching-over is effected by a program control installation 21 which, upon initiating a photograph, is activated by the pushbutton switch 22. It likewise acts on the deflection stages 11 and 12 and initiates (or triggers) the photograph of the camera 7 (not illustrated in FIG. 6).

Figure 7:
FIGS. 7 through 9 illustrate voltage waveforms for the purpose of explaining FIG. 6.
Figure 8:
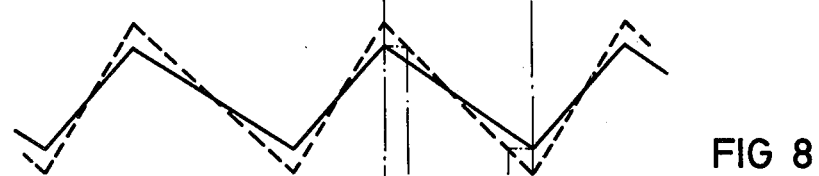
Figure 9:
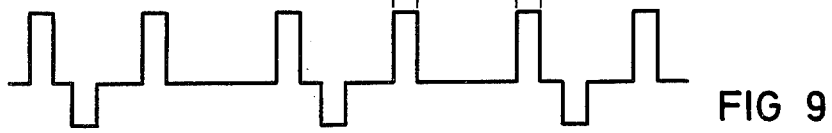

The method of operation of this embodiment shall now be explained in greater detail on the basis of FIGS. 7 through 9. In FIG. 7, the video signal is again illustrated which is connected to the input of the monitor 6. During fluoroscopy the video amplifier 16 is connected via the changeover switch 20 with the picture tube 13, so that the image appears completely on the monitor. The deflection stages 11 and 12 generate a deflection voltage which, for example, corresponds to the sawtooth voltage illustrated by dash lines in FIG. 8. If a monitor photograph is now to take place, the program control installation 21 is set in operation through activation of the pushbutton switch 22. The installation 21 controls the deflection stages 11 and 12 in such a manner that the deflection voltages are decreased, so that they correspond, for example, to the curve illustrated by the solid line in FIG. 8. This can proceed, for example, through reduction of the operating voltages of the deflection stages 11 and 12. The monitor image is thereby reduced. Subsequently the camera 7 is triggered. After sufficient exposure the changeover switch 20 is switched over so that now the pulse stage 18 is connected with the picture tube 13. The pulse stage 18 generates an output signal which is illustrated in FIG. 9. The rectangular voltage pulses illustrated positively here produce the bright frame on the viewing screen. Simultaneously with the activation of the changeover switch 20, the deflection stages 11 and 12 are switched over to their original greater deflection voltages, so that the frame extends from the border of the already photographed monitor image to the viewing screen edge. The drawn auxiliary lines between FIGS. 7-9 here serve the purpose of illustrating the chronological relations of the voltage values to one another.

After completed frame exposure, the camera 7 is disconnected and the changeover switch 20 is brought into its illustrated position, so that the x-ray image is again completely displayed on the monitor.

The dark frame on the film can also be employed for the representation of additional data. Thus, for example, patient and documentation data, measurement or adjustment values, can be faded into the dark frame, which data do not interfere during viewing. The entire photographic format can thereby be utilized for the purpose of image representation.

The cited embodiments are suited for every photographic camera, however, in particular, for multiformat cameras in which the photographs are disposed adjacent one another on a sheet film. Through the bright frames, which are jointly exposed during photography, the images in the negative are separated from one another by a dark strip so that a viewing can take place in a problem-free fashion.

In the case of the last-described embodiment with successive image and dark frame exposure, it is also conceivable, in the case of multiformat cameras, to first photograph all images and subsequently, after a switching-over of the camera, to photograph all at once a frame pattern—generated by the pulse stage 18—corresponding to the photographed image separation.

In the case of the previously described technology, the photography proceeds with a frame surrounding the monitor image. This has the advantage that the photographs can overlap one another, so that a dark interstice in the case of photographs is guaranteed by all means without portions of the image being lost. Instead of the frame, it is also possible to fade into the monitor image only a horizontal and a vertical bar, respectively. In lining up the photographs, the same dark interstice thus results.

Through the described embodiments the monitor image is only slightly reduced, so that, in the case of the viewing screens in use today, no resolution losses result. The photographed image again exhibits the same size as in the case of the known technology, only now the interstice between the individual photographs on the negative is dark, so that the correct adaptation of the eyes can take place during a viewing of said negative.

It will be apparent that many modifications and variations may be effected without departing from the scope of the novel concepts and teachings of the present invention.

We claim as our invention:

1. An x-ray television installation for monitor photography, comprising an x-ray tube having a ray path along which x-ray energy is directed for producing an x-ray image, an x-ray image intensifier arranged in said ray path of said x-ray tube and having an output fluorescent screen for supplying an intensified optical image in accordance with an incident x-ray image, a video camera optically coupled with said output fluorescent screen of said x-ray image intensifier for generating a video signal in accordance with the optical image supplied thereby, a video monitor comprising a video display unit having an image display screen for displaying the video signal as a visible image, a video amplifier connecting said video camera with said video display unit so as to supply an amplified video signal to the video display unit for display thereby, a synchronizing pulse separation stage being connected with the video camera for supplying a synchronizing pulse signal synchronized with the video signal, a horizontal deflection stage and a vertical deflection stage connected between said separation stage and said video display unit for controlling the display of the video signal thereby, a blanking stage synchronized with said horizontal deflection stage and said vertical deflection stage and controlling blanking of the video display unit at horizontal and vertical retrace intervals during the display of the video signal, and a photographic camera optically coupled with the image display screen of the video display unit for photographing the display of the video signal thereon, characterized in that a pulse stage coupled with said synchronizing pulse separation stage and with said video display unit generates unblanking pulses in synchronism with the operation of the horizontal and vertical deflection stages so as to generate visible bars on said image display screen of said video display unit, the bars being at the border of the image display screen for bounding the visible image produced by said video signal, the photographic camera being so designed that the visible images produced on the video display unit are photographed adjacent one another with the bars eliminating unexposed interstices between adjacent photographed images, and characterized in that mixing means is connected with the pulse stage and the video amplifier, and supplies an output signal to the video display unit, and that the deflection stages provide sawtooth voltages having active sweep portions which are substantially longer in duration than the duration of the active sweep intervals of the video camera such that the visible bars generated on the image display screen during such active sweep portions are included on the image display screen without loss of the image contents of said video signal.

2. An x-ray television installation for monitor photography, comprising an x-ray tube (2) having a ray path along which x-ray energy is directed for producing an x-ray image, an x-ray image intensifier (4) arranged in said ray path of said x-ray tube and having an output fluorescent screen for supplying an intensified optical image in accordance with an incident x-ray image, a video camera (5) optically coupled with said output fluorescent screen of said x-ray image intensifier (4) for generating a video signal in accordance with the optical image supplied thereby, a video monitor comprising a video display unit (13, 14) having an image display screen for displaying the video signal as a visible image, a video amplifier (16) connecting said video camera (5) with said video display unit so as to supply an amplified video signal to the video display unit for display thereby, a synchronizing pulse separation stage (10) being connected with the video camera for supplying a synchronizing pulse signal synchronized with the video signal, a horizontal deflection stage (11) and a vertical deflection stage (12) connected between said separation stage (10) and said video display unit for controlling the display of the video signal thereby, a blanking stage (15) synchronized with said horizontal deflection stage (11) and said vertical deflection stage (12) and controlling blanking of the video display unit at horizontal and vertical retrace intervals during the display of the video signal, and a photographic camera (7) optically coupled with the image display screen of the video display unit for photographing the display of the video signal thereon, characterized in that a pulse stage (18) coupled with said synchronizing pulse separation stage (10) and with said video display unit generates unblanking pulses in synchronism with the operation of the horizontal and vertical deflection stages (11 and 12) so as to generate bright bars on said image display screen of said video display unit, the bars being at the border of the image display screen for bounding the visible image produced by said video signal, the photographic camera (7) being so designed that the visible images produced on the video display unit are photographed adjacent one another with the bars eliminating unexposed interstices between adjacent photographed images, characterized in that changeover switch means (20) is present through which the outputs of the pulse stage (18) and of the video amplifier (16) are capable of being selectively connected to the video display unit, and that a program control installation is connected with the horizontal and the vertical deflection stages (11, 12) and with the changeover switch means (20), said program control installation controlling said changeover switch means (20) during a first photographic operation to connect the video amplifier (16) with the video display unit and controlling the deflection stages (11, 12) to decrease the amplitudes of the sawtooth voltages of the deflection stages (11, 12) to effect an image exposure, and during a second photographic operation controls the changeover switch means (20) in such a manner that the pulse stage (18) is connected with the video display unit to effect exposure of the bright bars for bounding the photographed image.

* * * * *